United States Patent
Xu et al.

(10) Patent No.: US 8,229,475 B2
(45) Date of Patent: Jul. 24, 2012

(54) METHOD FOR IMPROVING PERFORMANCE OF MOBILE BROADBAND WIRELESS ACCESS SYSTEM

(75) Inventors: Ling Xu, Shenzhen (CN); Qinghai Zeng, Shenzhen (CN)

(73) Assignee: ZTE Corporation (CN)

( * ) Notice: Subject to any disclaimer, the term of this patent is extended or adjusted under 35 U.S.C. 154(b) by 595 days.

(21) Appl. No.: 12/301,531

(22) PCT Filed: Mar. 12, 2007

(86) PCT No.: PCT/CN2007/000794
§ 371 (c)(1),
(2), (4) Date: Jun. 17, 2009

(87) PCT Pub. No.: WO2007/134511
PCT Pub. Date: Nov. 29, 2007

(65) Prior Publication Data
US 2009/0280840 A1  Nov. 12, 2009

(30) Foreign Application Priority Data
May 20, 2006  (CN) .......................... 2006 1 0060842

(51) Int. Cl.
*H04W 68/00* (2009.01)
(52) U.S. Cl. ..................... 455/458; 455/515; 455/434
(58) Field of Classification Search .................. 455/458, 455/426.1, 515, 438, 434
See application file for complete search history.

(56) References Cited

U.S. PATENT DOCUMENTS

| | | | |
|---|---|---|---|
| 7,366,524 B2 * | 4/2008 | Watanabe et al. | 455/458 |
| 8,032,159 B2 * | 10/2011 | Wu et al. | 455/458 |
| 2005/0250474 A1 | 11/2005 | Hong et al. | |
| 2006/0014550 A1 * | 1/2006 | Ryu et al. | 455/458 |
| 2009/0291695 A1 * | 11/2009 | Lipford et al. | 455/458 |

FOREIGN PATENT DOCUMENTS

| EP | 1 507 432 A2 | 2/2005 |
|---|---|---|
| JP | 2006-140704 A | 6/2006 |

OTHER PUBLICATIONS

Das et al., "System Aspects and Handover Management for IEEE 802.16E," Bell Labs Technical journal, Wiley, CA, US, vol. 1, No. 11, Mar. 21, 2006, pp. 123-142.

* cited by examiner

*Primary Examiner* — Anthony Addy
*Assistant Examiner* — Shahriar Behnamian
(74) *Attorney, Agent, or Firm* — Brooks Kushman P.C.

(57) ABSTRACT

A method for improving performance of mobile broadband wireless access system is disclosed. The method comprises the steps: first, a paging controller controls base stations to transmit paging broadcasting messages to mobile stations; the mobile stations respond to the paging controller through the base station which responds with the mobile stations; then, the paging controller transmits paging notice message to note that the base stations which do not respond with the mobile stations stop transmitting the paging broadcasting messages in the paging group; last, the base stations in the paging group immediately stop transmitting the paging broadcasting messages as to the mobile station, and delete the corresponding data, after they receive the paging notice message which the paging controller transmits. By use of the present method, the base station processing and the storing cost are not remarkably increased, legal-user's paging errors caused by non-legal accessing message are avoided, and the occupying of network wireless resources and system resources can be effectively reduced.

19 Claims, 7 Drawing Sheets

METHOD FOR IMPROVING PERFORMANCE OF MOBILE BROADBAND WIRELESS ACCESS SYSTEM

TECHNICAL FIELD

The present invention relates to a method for reducing inefficient occupation of wireless resources and system resources in mobile broadband wireless access system.

BACKGROUND OF THE INVENTION

IEEE802.16e is a broadband wireless access standard established by the IEEE standard organization. Compared with IEEE802.16-2004, IEEE802.16e is added with many methods, such as switching and power saving mechanism, to support the mobility of mobile stations (MS).

Idle mode is a very important power saving mechanism in 802.16e system. In order to support the paging of the mobile stations in idle mode, the standard offers the definition of paging area. A plurality of base stations (BSs) are assigned as a paging area, and overlapping among paging areas is allowable. Several paging areas are administrated by a paging controller (PC). As shown in FIG. 1, the base stations BS0 and BS1 belong to paging group A, the base stations BS1 and BS2 to paging group B; the paging controller PC0 controls paging group A while the paging controller PC1 controls paging group B; and the PCs connect with location register (LR) to save the relevant information of the mobile station. Referring to FIG. 1, PC0 connects with the location register LR0, while PC1 with the location register LR1.

When MS is in idle mode, the PC can send paging message to initiate a paging process in the following conditions:

1. there is data in application layer being sent to a mobile station in idle mode;
2. the network side actively requests the mobile station in idle mode to update its position.

In the above conditions, all the base stations in the paging group to which the mobile station belongs will send MOB-PAG-ADV message. According to the instruction in the MOB-PAG-ADV message, the mobile station takes corresponding action.

Since all the base stations in the paging group to which the mobile station belongs will send MOB-PAG-ADV message while the mobile station can only respond to one of the base stations, the other base stations which have not received the response will continue paging broadcasting. Thus, the technical problem in this process to be solved is how to terminate the unnecessary paging broadcasting as soon as possible and to reduce the occupation of the wireless resources, while to ensure the MOB-PAG-ADV message to be received by the mobile station as far as possible. The Network Working Group (NWG) in WiMAX organization offers the basic flow of paging and defines the fields of paging starting and ending in the message. However, there is a limitation in the flow, i.e., it does not define how to use paging termination mechanism in all kinds of conditions.

Therefore, an optimized procedure and method about how to use the paging termination mechanism in paging process to reduce the occupation of resources, especially the wireless resources, are required by the industry.

SUMMARY OF THE INVENTION

Aiming at the defects and shortcomings existing in the prior art, the purpose of the present invention is to provide a method by which the transmission of MOV-PAG-ADV message by the base stations can be stopped immediately during the paging process, so as to save wireless resources and system resources in the network, and improve the performance of the mobile broadband wireless access system.

In order to achieve the above purpose, the present invention offers a method for improving the performance of the mobile broadband wireless access system, which specifically includes the following steps of:

Step 1, a paging controller controls base stations to send MOB-PAG-ADV message to a mobile station; the mobile station responds to the paging controller through the base station which responds to the mobile station;

Step 2, the paging controller sends a paging notice message to inform those base stations in the paging group which do not respond to the mobile station to stop sending MOB-PAG-ADV message;

Step 3, the base stations in the paging group instantly stop sending the wireless MOB-PAG-ADV message as to the mobile station and delete corresponding data after they receive the paging notice message sent by the paging controller.

Said step 1 has the following three implementation modes:

Mode 1, step 1 further includes the following steps:

Step a, when the network needs to start up a paging process, the paging controller to which the mobile station in idle state belongs constructs a paging notice message which indicates the purpose of the paging and indicates to start the paging; the paging controller sends the paging notice message to all base stations in the paging group related to the mobile station;

Step b, after the base station receive the paging notice message from the paging controller, it constructs and sends the MOB-PAG-ADV message to the mobile station;

Step c, the mobile station sends RNG-REQ message to the base station according to the instruction in the MOB-PAG-ADV message;

Step d, if the base station receiving the RNG-REQ message has validity check information, it performs validity check;

Step e, if the validity check is passed, the base station receiving the RNG-REQ message informs the paging controller which manages the mobile station that the access response from the mobile station has been received successfully;

If the validity check is not passed, the base station receiving the RNG-REQ message discards this RNG-REQ message, continues to send MOB-PAG-ADV message and waits for response from the mobile station; or the base station stops sending MOB-PAG-ADV message and immediately starts a complete process of re-access to the network.

In the process of updating the position of the mobile station, said step e specifically is: after the validity check is passed, the base station receiving the RNG-REQ message informs the paging controller which manages the mobile station through the position update request message that the access response from the mobile station has been received successfully; and the paging controller sends the position update response to the base station receiving the RNG-REQ message.

During the process that the mobile station exits the idle mode, said step e specifically is: after the validity check is passed, the base station receiving the RNG-REQ message informs the paging controller which manages the mobile station through the mobile station information request message that the access response from the mobile station has been received successfully.

Mode 2, said step 1 further includes the following steps:

Step a', when the network needs to start up a paging process, the paging controller to which the mobile station in idle mode belongs constructs a paging notice message, which indicates the purpose of the paging and indicates to start the paging; the paging controller sends the paging notice message to all base stations in the paging group related to the mobile station;

Step b', after the base station receives the paging notice message from the paging controller, it constructs and sends MOB-PAG-ADV message to the mobile station;

Step c', the mobile station sends a RNG-REQ message to the base station according to the instruction in the MOB-PAG-ADV message;

Step d' if the base station receiving the RNG-REQ message has no validity check information, it obtains the validity check information first and performs validity check;

Step e', if the validity check is passed, the base station receiving the RNG-REQ message informs the paging controller which manages the mobile station that the access response from the mobile station has been received successfully;

If the validity check is not passed, the base station receiving the RNG-REQ message discards this RNG-REQ message, continues to send the MOB-PAG-ADV message and waits for the response from the mobile station; or the base station stops sending the MOB-PAG-ADV message and immediately restarts a complete process of re-access to the network.

In the process of updating the position of the mobile station, said step e' specifically is: after the validity check is passed, the base station receiving the RNG-REQ message informs the paging controller which manages the mobile station through the position update acknowledge message that the access response from the mobile station has been received successfully.

During the process that the mobile station exits the idle mode, said step e' specifically is: after the validity check is passed, the base station receiving the RNG-REQ message sends a paging response to inform the paging controller which manages the mobile station that the access response from the mobile station has been received successfully; or the base station receiving the RNG-REQ message informs the paging controller which manages the mobile station by deleting the mobile station information message that the access response from the mobile station has been received successfully, and the mobile station has completed the network re-access.

Method 3, said step 1 further includes the following steps:

Step a", when the network needs to start up a paging process, the paging controller to which the mobile station in idle mode belongs constructs a paging notice message which indicates the purpose of the paging and indicates to start the paging; the paging controller sends the paging notice message to all base stations in the paging group related to the mobile station;

Step b", after the base station receiving the paging notice message from the paging controller, it constructs and sends a MOB-PAG-ADV message to the mobile station;

Step c", the mobile station sends a RNG-REQ message to the base stations according to the instruction in the MOB-PAG-ADV message;

Step d", the base station receiving the RNG-REQ message informs the paging controller which manages the mobile station that the access response from the mobile station has been received successfully.

In the process of updating the position of the mobile station, said step d" specifically is: the base station receiving the RNG-REQ message informs the paging controller which manages the mobile station through the position update request message that the access response from the mobile station has been received successfully; the paging controller sends the position update response to the base station receiving the RNG-REQ message.

During the process that the mobile station exits the idle mode, the step d" specifically is: the base station receiving the RNG-REQ message informs, through mobile station information request message, the paging controller which manages the mobile station that the access response from the mobile station has been received successfully.

Furthermore, step e is followed by step 4, where the base station receiving the RNG-REQ message sends a RNG-RSP to the mobile station.

The method of the present invention for improving system performance in mobile broadband wireless access system can effectively reduce occupation of network wireless resources and system resources which is resulted from that the base stations in the paging group repeatedly send the MOB-PAG-ADV message due to not having received the access response.

By using the method of the present invention, only one field or a notice message in the system is added, so the processing and the storage cost of the base station will not increase significantly.

Since it can be chosen that the paging controller is informed of receiving the access response message successfully after checking the ranging message, paging failure of legal users due to the illegal access message can be avoided.

DESCRIPTION OF THE PREFERRED EMBODIMENTS

The present invention will be described in detail with combination of accompanying figures and specific embodiments.

Figure 1:
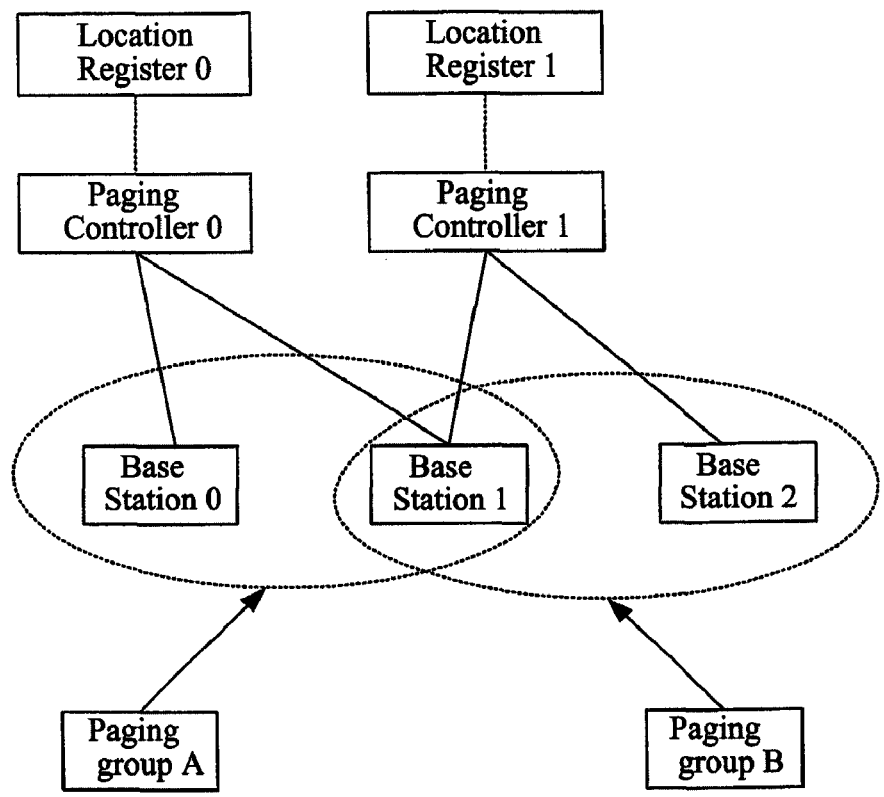
FIG. 1 is a schematic diagram of the paging function logic entity formation in 802.16e system.
Figure 2:
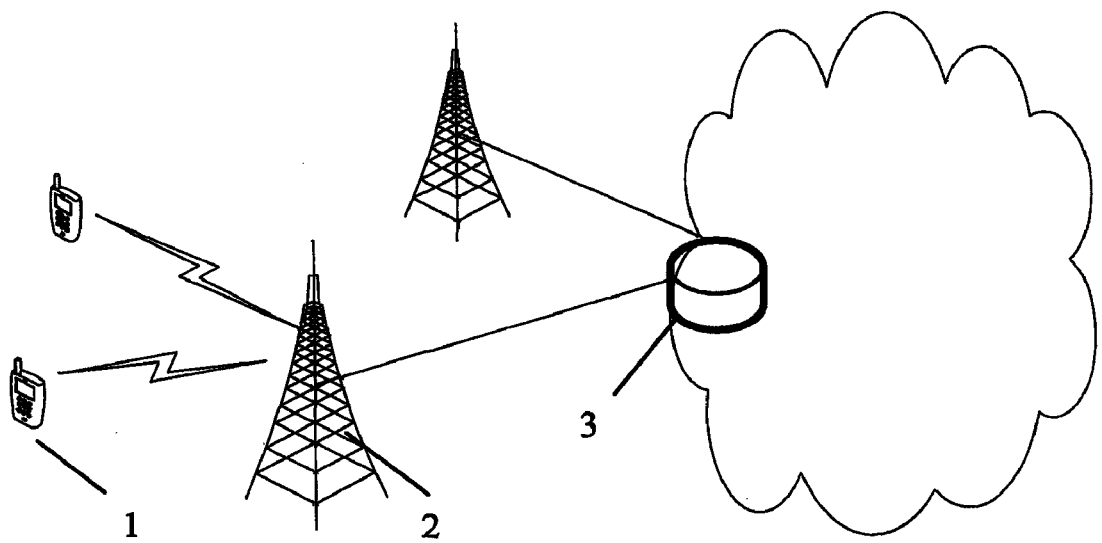
FIG. 2 is a schematic diagram of networking in 802.16e system.

The structural diagram of the network in 802.16e system is shown as FIG. 2, wherein mobile station 1 accesses to the core network through base station 2 and access gateway 3.

The First Preferred Embodiment

Figure 3:
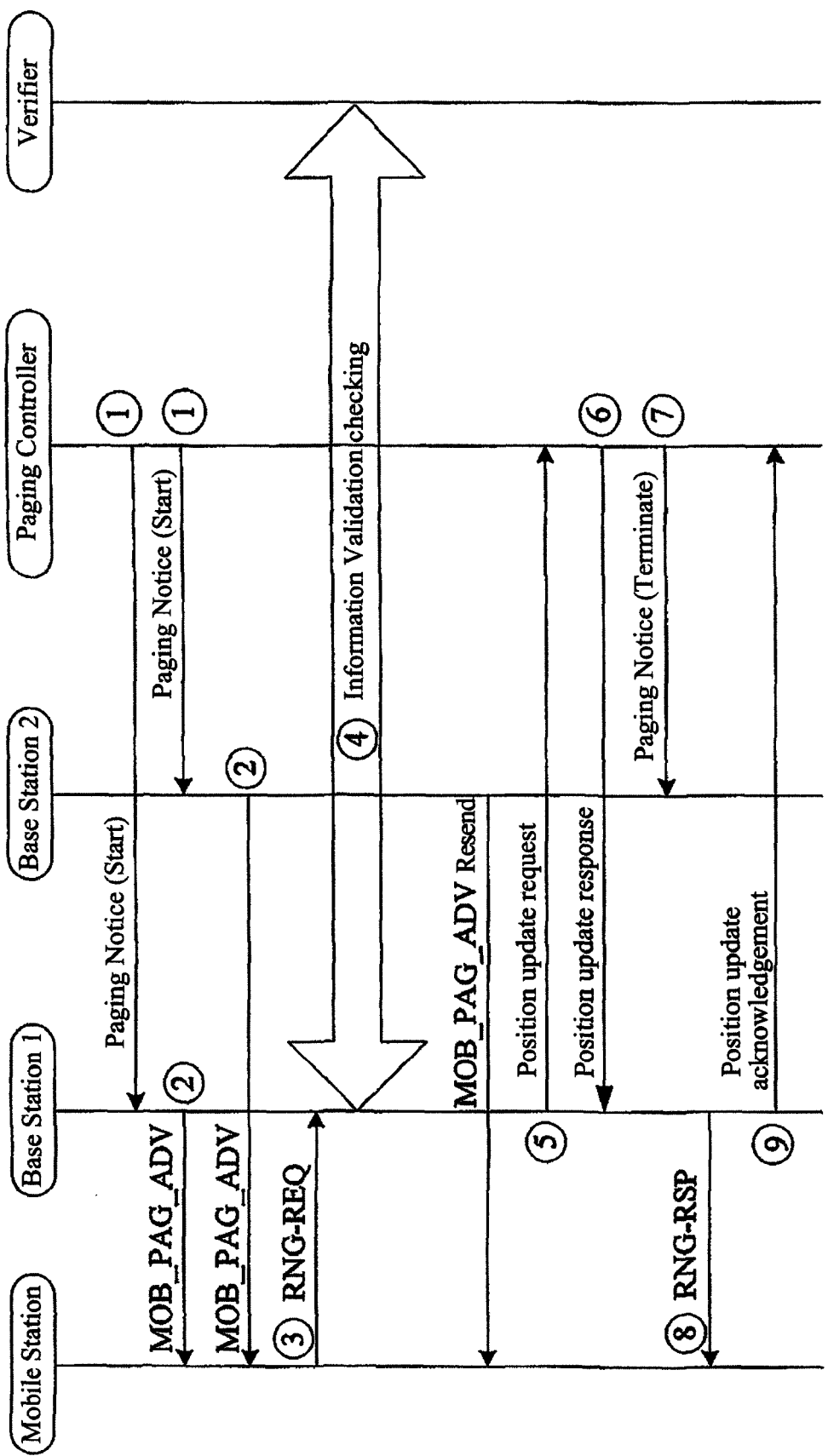
FIG. 3 is a schematic diagram of the flow of position updating initiated by the network in accordance with the first preferred embodiment of the present invention.

FIG. 3 shows the schematic diagram of the flow of position updating initiated by the network in accordance with the first preferred embodiment of the present invention. The flow is described as follows;

(1) one mobile station is in idle mode and its position has not been updated for a period of time; the paging controller managing this mobile station constructs and sends a paging notice message (updating the position and starting the paging) to all base stations in the paging group to which the mobile station belongs, requesting the mobile station to perform position updating process.

(2) After the base station receives the paging notice message, it determines that a paging needs to be initiated, and constructs a MOB-PAG-ADV according to the IEEE802.16e and send it in the air.

(3) the mobile station receives the MOB-PAG-ADV and is requested to update its position according to the instruction in the MOB-PAG-ADV, then it sends RNG-REQ message to the base station.

(4) A base station BS1 receives the RNG-REQ message from the mobile station, if BS1 has already obtained the validity check information through the verifier, it will instantly perform validity check.

(5) If the validity check is passed, BS1 informs, in the position update request message, the paging controller managing the mobile station that the access response from the mobile station has been received successfully. Meanwhile, other base stations not receiving the RNG-REQ access message resend the MOB-PAG-ADV including the mobile station information.

If the validity check is not passed, BS1 discards the RNG-REQ message, continues to send the wireless MOB-PAG-ADV and waits for response from the mobile station; or it can also stop sending the MOB-PAG-ADV and instantly start a complete process of re-access to the network.

(6) The paging controller receives the message from the BS1 and responds to BS1 with a position update response message.

(7) After being notified that BS1 has received access response from the mobile station, the paging controller needs to re-construct and send the paging notice message which directs all base stations in the paging group associated with the mobile station to stop sending the MOB-PAG-ADV.

All the base stations in the paging group receive the paging notice message from the paging controller which requires stopping paging broadcasting in the air, the base stations instantly stop sending the MOB-PAG-ADV in the air as to the mobile station and delete the corresponding data.

(8) BS1 sends RNG-RSP to the mobile station.

(9) BS1 sends the position update acknowledge message to the paging controller, and the process of updating position is completed.

The Second Preferred Embodiment

Figure 4:
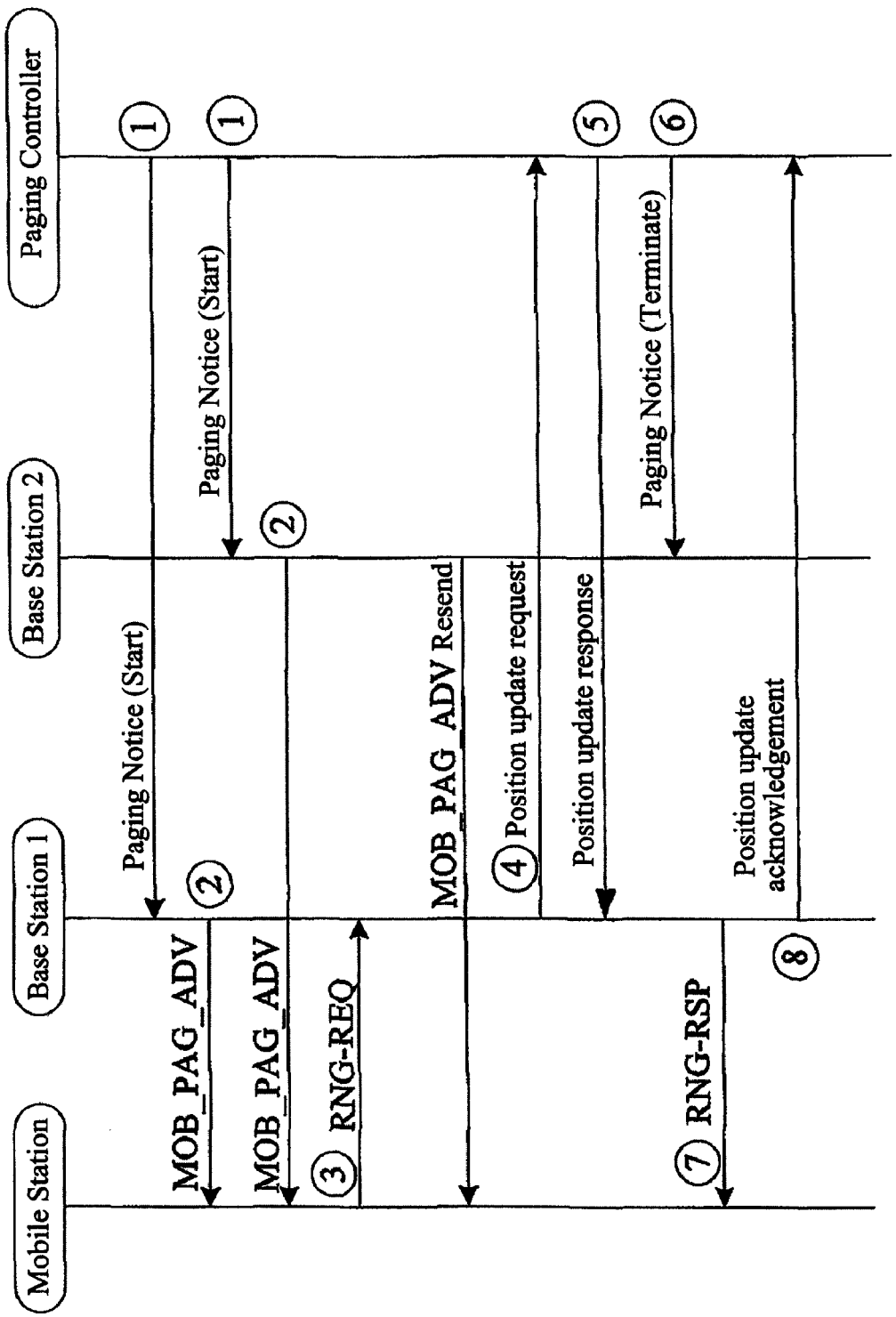
FIG. 4 is a schematic diagram of the flow of position updating initiated by the network in accordance with the second preferred embodiment of the present invention.

FIG. 4 shows the schematic diagram of the flow of position updating initiated by the network in accordance with the second preferred embodiment of the present invention. The flow is described as follows:

(1) one mobile station is in idle mode and its position has not been updated for a period of time; the paging controller managing the mobile station constructs and sends a paging notice message (updating the position and starting the paging) to all base stations in the paging group to which the mobile station belongs, requesting the mobile station to perform position updating process.

(2) After receiving the paging notice message, the base station determines that a paging needs to be initialized, then the base station constructs a MOB-PAG-ADV according to IEEE802.16e and sends it in the air.

(3) the mobile station receives the MOB-PAG-ADV and is notified that it needs to update its position according to the instruction in the MOB-PAG-ADV, then it sends RNG-REQ message to the base station.

(4) one base station BS1 receives the RNG-REQ message from the mobile station, BS1 notifies, in the position update request message, the paging controller which manages the mobile station that the access response from the mobile station has been received successfully. Meanwhile, other base stations not receiving the RNG-REQ access message resend the MOB-PAG-ADV including the information of the mobile station.

(5) The paging controller receives the message from the BS1 and responds to the BS1 with a position update response message.

(6) After the paging controller acquires that BS1 has received the access response from the mobile station, it needs to reconstruct and send a paging notice message which directs all base stations in the paging group associated with the mobile station to stop sending the MOB-PAG-ADV.

All the base stations in the paging group receive the paging notice message from the paging controller which requires stopping paging broadcasting in the air, then the base stations instantly stop sending the MOB-PAG-ADV in the air as to the mobile station and delete the corresponding data.

(7) BS1 sends RNG-RSP to the mobile station.

(8) BS1 sends position update acknowledgement message to the paging controller, and the process of updating position is completed.

The Third Preferred Embodiment

Figure 5:
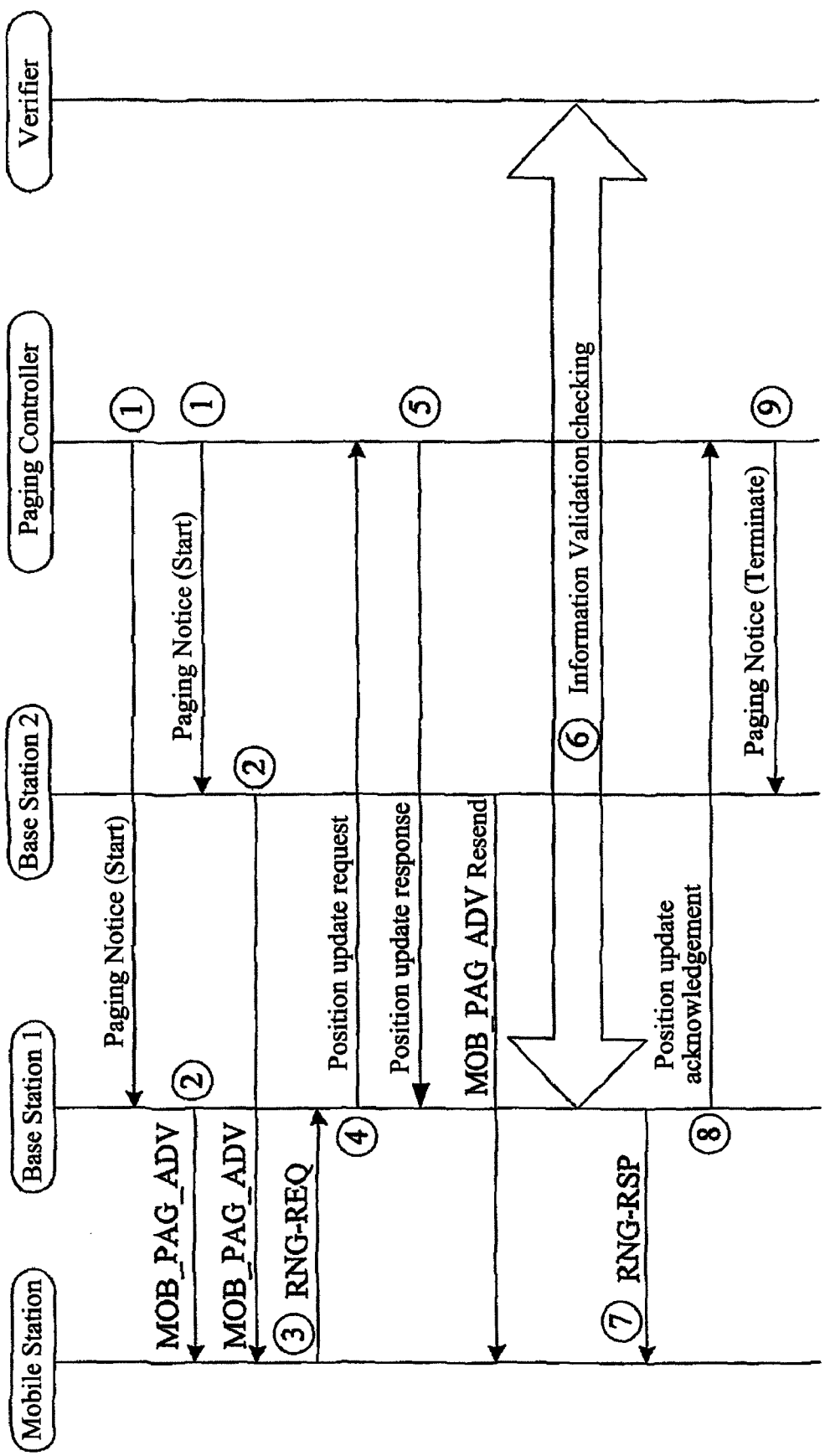
FIG. 5 is a schematic diagram of the flow of position updating initiated by the network in accordance with the third preferred embodiment of the present invention.

FIG. 5 shows the schematic diagram of the flow of position updating initiated by the network in accordance with the third preferred embodiment of the present invention. The flow is described as follows:

(1) one mobile station is in idle mode and its position has not been updated for a period of time; the paging controller managing the mobile station constructs and sends a paging notice message (updating the position and starting the paging) to all base stations in the paging group to which the mobile station belongs, requesting the mobile station to update its position.

(2) After receiving the paging notice message, the base station determines that a paging needs to be initiated, then the base station constructs a MOB-PAG-ADV according to IEEE802.16e and send it in the air.

(3) the mobile station receives the MOB-PAG-ADV and is informed that it needs to update the position according to the instruction in the MOB-PAG-ADV, then it sends RNG-REQ message to the base station.

(4)-(6) a base station BS1 receives the RNG-REQ message from the mobile station; the message needs to be checked but there is no validity check information, then the BS1 obtains the validity check information from the verifier and performs the validity check.

(7) If the validity check is passed, BS1 notifies, in the position update acknowledgement message, the paging controller which manages the mobile station that the access response from the mobile station has been received successfully. Meanwhile, other base stations not receiving the RNG-REQ access message resend the MOB-PAG-ADV including the information of the mobile station.

If the validity check is not passed, BS1 discards the RNG-REQ message and continues to send the MOB-PAG-ADV in the air and waits for response from the mobile station; or BS1 can also stop sending the MOB-PAG-ADV and instantly start a complete process of re-access to the network.

(8) After the paging controller is notified that BS1 has received access response from the mobile station, it needs to reconstruct and send a paging notice message which directs all base stations in the paging group associated with the mobile station to stop sending the MOB-PAG-ADV.

After all the base stations in the paging group receive the paging notice message from the paging controller requesting stopping paging broadcasting in the air, the base stations instantly stop sending the MOB-PAG-ADV in the air as to the mobile station and delete the corresponding data.

(9) meanwhile, BS1 sends RNG-RSP to the mobile station, and the process of updating the position is completed.

The Fourth Preferred Embodiment

Figure 6:
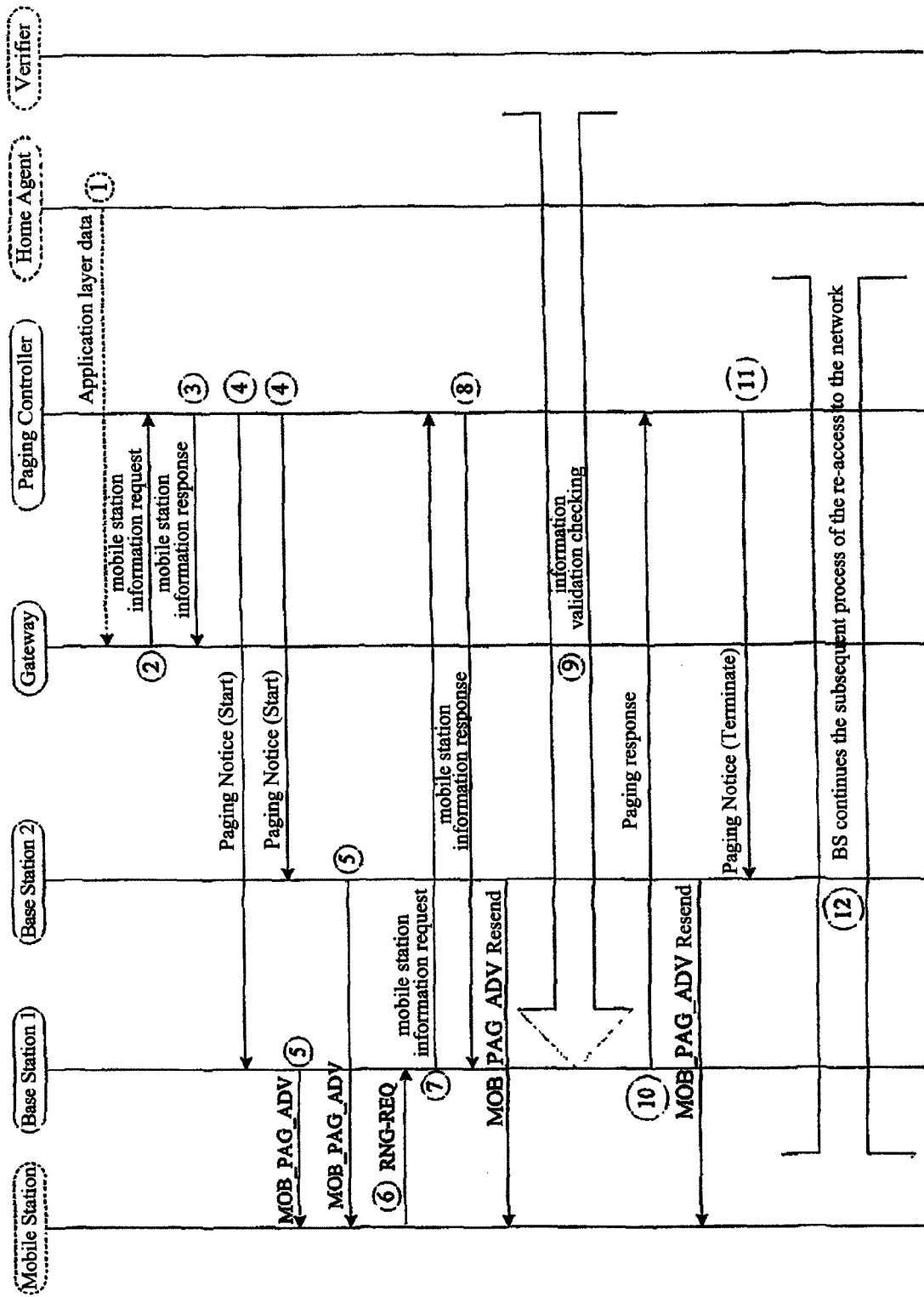
FIG. 6 is a schematic diagram of the flow of the mobile station exiting the idle mode in accordance with the fourth preferred embodiment of the present invention.

FIG. 6 shows the schematic diagram of the flow of the mobile station exiting the idle mode in accordance with the fourth preferred embodiment of the present invention. The flow is described as follows:

(1) There is data in application layer needing to be sent to a mobile station in idle mode; the home agent sends the data to the access gateway to which the mobile station currently belongs.

(2) The gateway requests the related information of the mobile station from the paging controller to which the mobile station belongs.

(3)-(4) The paging controller returns some information of the mobile station to the gateway, and sends a paging notice message to all the base stations in the paging group to which the mobile station belongs, requesting to start paging broadcasting.

(5) After the base station receives the paging notice message, it sends air interface MOV-PAG-ADV.

(6) The mobile station acquires from the indication in the MOV-PAG-ADV that there is data paging it, then the mobile station sends RNG-REQ message to the base station.

(7)-(9) The base station receives the RNG-REQ message, obtains validity check information through verifier to perform message check.

(10) If the validity check is passed, BS1 sends a paging response message to inform the paging controller of the mobile station that the access response from the mobile station has been received successfully. Meanwhile, other base stations not receiving the RNG-REQ access message resend the MOB-PAG-ADV including the information of the mobile station.

If the validity check is not passed, the BS1 discards the RNG-REQ message and continues to send the MOB-PAG-ADV in the air and waits for response from the mobile station; or BS1 can also stop sending the MOB-PAG-ADV and instantly start a complete process of re-access to the network.

(11) After the paging controller receives the message from the BS1 and is informed that BS1 has received the access response from the mobile station, the paging controller needs to reconstruct and send a paging notice message which directs all the base stations in the paging group associated with the mobile station to stop sending the MOB-PAG-ADV.

After all the base stations in the paging group receive the paging notice message from the paging controller which requests to stop paging broadcasting in the air, they instantly stop sending the MOB-PAG-ADV in the air as to the mobile station and delete the corresponding data.

(12) the subsequent flow of exiting the idle mode continues according to the NWG specification, which is not further described here.

The Fifth Preferred Embodiment

Figure 7:
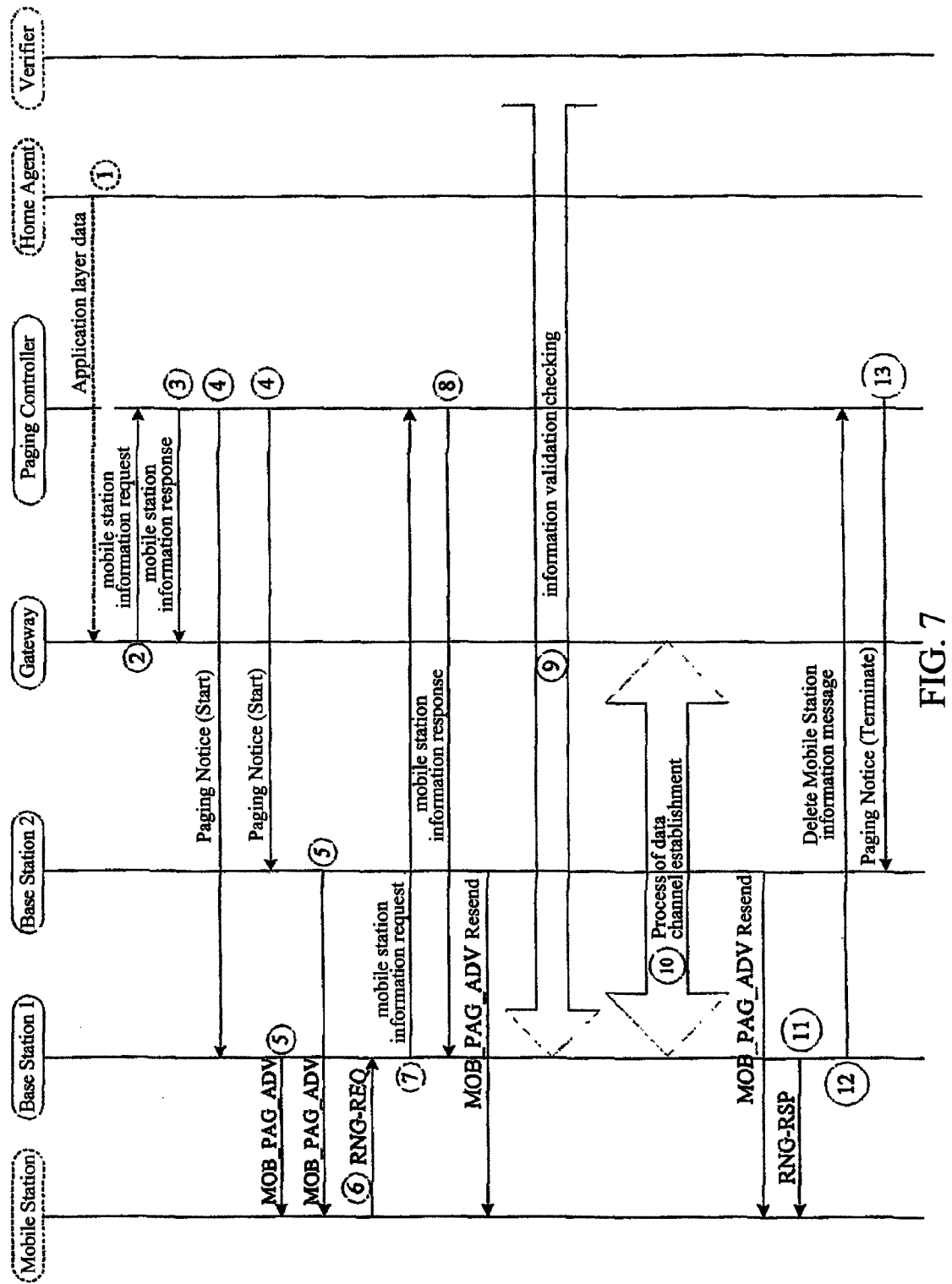
FIG. 7 is a schematic diagram of the flow of the mobile station exiting the idle mode in accordance with the fifth preferred embodiment of the present invention.

FIG. 7 shows the schematic diagram of the flow of the mobile station exiting the idle mode in accordance with the fifth preferred embodiment of the present invention. The flow is described as follows:

(1) There is data in the application layer to be sent to a mobile station in idle mode; the home agent sends the data to the access gateway to which the mobile station currently belongs.

(2) The gateway requests the related information of the mobile station from the paging controller to which the mobile station belongs.

(3)-(4) The paging controller returns some information of the mobile station to the gateway, and sends a paging notice message to all the base stations in the paging group to which the mobile station belongs, requesting to start paging broadcasting.

(5) After the base station receives the paging notice message, it sends air interface MOB-PAG-ADV.

(6) The mobile station acquires from the indication in the MOB-PAG-ADV that there is data paging it, then the mobile station sends RNG-REQ message to the base station.

(7)-(9) The base station receives the RNG-REQ message and obtains validity check information from the verifier to perform the message check.

(10) If the validity check is passed, BS1 begins the process of establishing a data channel.

If the validity check is not passed, BS1 discards the RNG-REQ message and continues to send the MOB-PAG-ADV in the air and waits for response from the mobile station; or BS1 can also stop sending the MOB-PAG-ADV and instantly start a complete process of re-access to the network.

(11) After the data channel is established, BS1 sends RNG-RSP message to the mobile station.

(12) BS1 notifies the paging controller which manages the mobile station through deleting mobile station information message that the access response from the mobile station has been received, and the mobile station completes the network re-access. Meanwhile, other base stations not receiving the RNG-REQ message still resend the MOB-PAG-ADV including the information of the mobile station.

(13) After the paging controller receives the message from BS1 and is informed that BS1 has received the access response from the mobile station, it needs to reconstruct and send a paging notice message which directs all the base stations in the paging group associated with the mobile station to stop sending the MOB-PAG-ADV.

After all the base stations in the paging group receive the paging notice message from the paging controller which requests to stop paging broadcasting in the air, they instantly stop sending the MOB-PAG-ADV in the air as to the mobile station and delete the corresponding data.

The Sixth Preferred Embodiment

Figure 8:
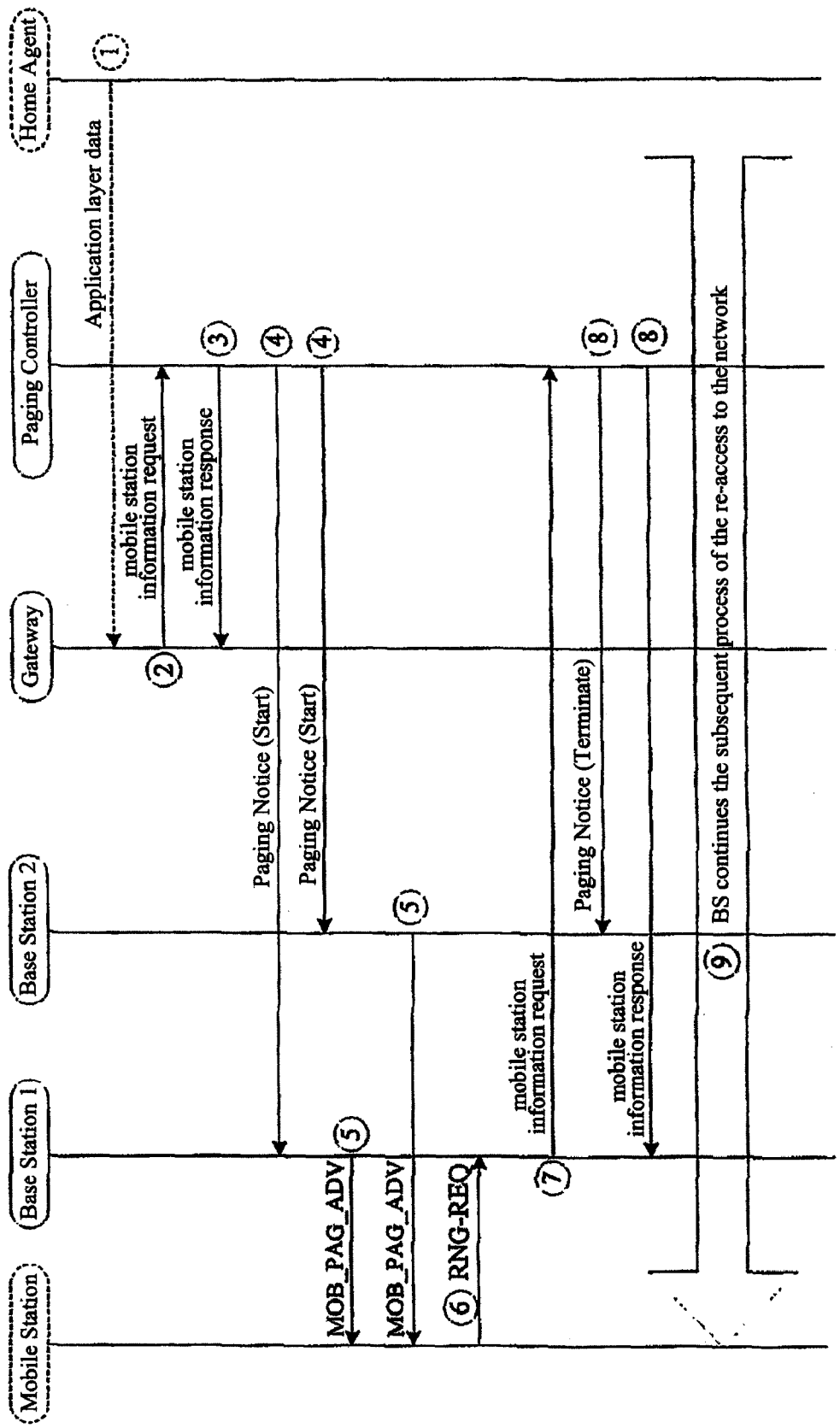
FIG. 8 is a schematic diagram of the flow of the mobile station exiting the idle mode in accordance with the sixth preferred embodiment of the present invention.

FIG. 8 shows the schematic diagram of the flow of the mobile station exiting the idle mode in accordance with the sixth preferred embodiment of the present invention. The flow is described as follows:

(1) There is data in the application layer to be sent to a mobile station in idle mode, and the home agent sends the data to the access gateway to which the mobile station currently belongs.

(2) The gateway requests the related information of the mobile station from the paging controller to which the mobile station belongs.

(3)-(4) The paging controller returns some information of the mobile station to the gateway, and sends a paging notice message to all the base stations in the paging group to which the mobile station belongs, requesting to start paging broadcasting.

(5) After the base station receives the paging notice message, it sends air interface MOV-PAG-ADV.

(6) The mobile station acquires from the indication in the MOV-PAG-ADV that there is data paging it, then the mobile station sends RNG-REQ message to the base station.

(7) BS1 receives the RNG-REQ message and notifies, in mobile station information request message, the paging controller which manages the mobile station that the access response from the mobile station has been received successfully, and the mobile station has completed the network re-access. Meanwhile, other base stations not receiving the RNG-REQ message resend the MOB-PAG-ADV including the information of the mobile station.

(8) the paging controller receives the message from BS1, responds with the response message of mobile station information, and reconstructs and sends the paging notice message which directs all base stations in the paging group associated with the mobile station to stop sending the MOB-PAG-ADV.

All the base stations in the paging group receives the paging notice message from the paging controller which requests to stop paging broadcasting in air, then the base stations instantly stop sending the MOB-PAG-ADV in the air as to the mobile station and delete the corresponding data.

(9) the subsequent flow of exiting the idle mode continues according to the NWG specification, which is not further described here.

Of course, the present invention may have many other embodiments. Therefore, without departing from the spirit and essence of the present invention, those skilled in the field can make all kinds of modification or variations which should be within the scope of the claims of the present invention.

What we claim is:

1. A method for improving performance of mobile broadband wireless access system, comprising:

Step 1, a paging controller controlling a base station to send a Mobile Paging Advertisement message (MOB-PAG-ADV message) to a mobile station; the mobile station responding to the paging controller through the base station which responses to the mobile station;

Step 2, the paging controller sending a paging notice message to inform base stations in paging group that do not respond to the mobile station to stop sending the MOB-PAG-ADV message;

Step 3, after receiving the paging notice message sent by the paging controller, the base stations in the paging group that do not respond to the mobile station instantly stopping sending the MOB-PAG-ADV message to the mobile station and deleting corresponding data;

wherein said step 1 comprises:

Step a, when a network needing to start up a paging process, the paging controller to which the mobile station in idle mode belongs constructing the paging notice message, which indicates purpose of the paging and starting the paging, the paging controller sending the paging notice message to all the base stations in the paging group associated with the mobile station;

Step b, after receiving the paging notice message from the paging controller, the base station constructing and sending the MOB-PAG-ADV message to the mobile station;

Step c, the mobile station sending a Ranging Request message (RNG-REQ message) to the base station according to the instruction in the MOB-PAG-ADV message;

Step d, if the base station which has received the RNG-REQ message has validity check information, performing validity check;

Step e, if the validity check is passed, the base station which has received the RNG-REQ message notifying the paging controller which manages the mobile station that an access response from the mobile station has been received successfully;

if the validity check is not passed, the base station which has received the RNG-REQ message discarding the RNG-REQ message, continuing to send the MOB-PAG-ADV message and waiting for the response from the mobile station; or the base station stopping sending the MOB-PAG-ADV message and immediately starting a complete process of re-access to the network.

2. The method for improving the performance of mobile broadband wireless access system according to claim 1, wherein during the process of updating the position of the mobile station, said step e comprises: after the validity check being passed, the base station which has received the RNG-REQ message notifying the paging controller which manages the mobile station, through a position update request message, that the access response from the mobile station has been received successfully; the paging controller sending a position update response to the base station which has received the RNG-REQ message.

3. The method for improving the performance of mobile broadband wireless access system according to claim 1, wherein during the process of the mobile station exiting the idle mode, said step e comprises: after the validity check is passed, the base station which has received the RNG-REQ message notifying the paging controller which manages the mobile station, through a mobile station information request message, that the access response from the mobile station has been received successfully.

4. The method for improving the performance of mobile broadband wireless access system according to claim 1, wherein said step 1 comprises:

Step a', when a network needing to start up a paging process, the paging controller to which the mobile stations in idle mode belong constructing a paging notice message, which indicates purpose of the paging and starting the paging, and the paging controller sending the paging notice message to all the base stations in the paging group associated with the mobile station;

Step b', after receiving the paging notice message from the paging controller, the base station constructing and sending the MOB-PAG-ADV message to the mobile station;

Step c', the mobile station sending a RNG-REQ message to the base station according to the instruction in the MOB-PAG-ADV message;

Step d', if the base station which has received the RNG-REQ message has no validity check information, the base station obtaining validity check information and then performing the validity check;

Step e', if the validity check is passed, the base station which has received the RNG-REQ message notifying the paging controller which manages the mobile station that the access response from the mobile station has been received successfully;

if the validity check is not passed, the base station which has received the RNG-REQ message discarding the RNG-REQ message, continuing to send the MOB-PAG-ADV message and waiting for the response from the mobile station, or the base station stopping sending the MOB-PAG-ADV message and immediately starting a complete process of re-access to the network.

5. The method for improving the performance of mobile broadband wireless access system according to claim 4, wherein during the process of updating the position of the mobile station, said step e' comprises: after the validity check is passed, the base station which has received the RNG-REQ message notifying the paging controller which manages the mobile station, through a position update acknowledge message, that the access response from the mobile station has been received successfully.

6. The method for improving the performance of mobile broadband wireless access system according to claim 4, wherein during the process of the mobile station exiting the idle mode, said step e' specifically comprises: after the validity check is passed, the base station which has received the RNG-REQ message sending a paging response to notify the paging controller which manages the mobile station that the access response from the mobile station has been received successfully; or the base station which has received the RNG-REQ message notifying the paging controller which manages the mobile station, by deleting the mobile station information message, that the access response from the mobile station has been received successfully, and the mobile station has completed the network re-access.

7. The method for improving the performance of mobile broadband wireless access system according to claim 1, wherein said step 1 comprises:

Step a", when a network needs to start up a paging process, the paging controller to which the mobile station in idle mode belongs constructing a paging notice message which indicates purpose of the paging and starting the paging, and the paging controller sending the paging notice message to all the base stations in the paging group associated with the mobile station;

Step b", after receiving the paging notice message from the paging controller, the base station constructing and sending a MOB-PAG-ADV message to the mobile station;

Step c", the mobile station sending a RNG-REQ message to the base station according to the instruction in the MOB-PAG-ADV message;

Step d", the base station which has received the RNG-REQ message notifying the paging controller which manages the mobile station that the access response from the mobile station has been received successfully.

8. The method for improving the performance of mobile broadband wireless access system according to claim 7, wherein during the process of updating the position of the mobile station, said step d" further comprises: the base station which has received the RNG-REQ message notifying the paging controller which manages the mobile station, through position update request message, that the access response from the mobile station has been received successfully; the paging controller sending the position update response to the base station which has received the RNG-REQ message.

9. The method for improving the performance of mobile broadband wireless access system according to claim 7, wherein during the process of the mobile station exiting the idle mode, said step d" further comprises: the base station which has received the RNG-REQ message notifying the paging controller which manages the mobile station, through the mobile station information request message, that the access response from the mobile station has been received successfully.

10. The method for improving the performance of mobile broadband wireless access system according to claim 1, further comprising step 4, wherein the base station which has received the RNG-REQ message sends a Ranging Response message (RNG-RSP message) to the mobile station.

11. The method for improving the performance of mobile broadband wireless access system according to claim 1, further comprising step 4, wherein the base station which has received the RNG-REQ message sends a Ranging Response message (RNG-RSP) message to the mobile station.

12. The method for improving the performance of mobile broadband wireless access system according to claim 2, further comprising step 4, wherein the base station which has received the RNG-REQ message sends a Ranging Response message (RNG-RSP message) to the mobile station.

13. The method for improving the performance of mobile broadband wireless access system according to claim 3, further comprising step 4, wherein the base station which has received the RNG-REQ message sends a Ranging Response message (RNG-RSP message) to the mobile station.

14. The method for improving the performance of mobile broadband wireless access system according to claim 4, further comprising step 4, wherein the base station which has received the RNG-REQ message sends a Ranging Response message (RNG-RSP message) to the mobile station.

15. The method for improving the performance of mobile broadband wireless access system according to claim 5, further comprising step 4, wherein the base station which has received the RNG-REQ message sends a Ranging Response message (RNG-RSP message) to the mobile station.

16. The method for improving the performance of mobile broadband wireless access system according to claim 6, further comprising step 4, wherein the base station which has received the RNG-REQ message sends a Ranging Response message (RNG-RSP message) to the mobile station.

17. The method for improving the performance of mobile broadband wireless access system according to claim 7, further comprising step 4, wherein the base station which has received the RNG-REQ message sends a Ranging Response message (RNG-RSP message) to the mobile station.

18. The method for improving the performance of mobile broadband wireless access system according to claim 8, further comprising step 4, wherein the base station which has received the RNG-REQ message sends a Ranging Response message (RNG-RSP message) to the mobile station.

19. The method for improving the performance of mobile broadband wireless access system according to claim 9, further comprising step 4, wherein the base station which has received the RNG-REQ message sends a Ranging Response message (RNG-RSP message) to the mobile station.

* * * * *

UNITED STATES PATENT AND TRADEMARK OFFICE
CERTIFICATE OF CORRECTION

PATENT NO.         : 8,229,475 B2
APPLICATION NO.    : 12/301531
DATED              : July 24, 2012
INVENTOR(S)        : Xu et al.

It is certified that error appears in the above-identified patent and that said Letters Patent is hereby corrected as shown below:

Column 9, Line 32, Claim 1:

After "the base station which"
Delete "responses" and
Insert -- responds --.

Signed and Sealed this
Twenty-third Day of October, 2012

David J. Kappos
*Director of the United States Patent and Trademark Office*